United States Patent [19]

Labrecque

[11] 4,092,947

[45] June 6, 1978

[54] OIL LEVEL INDICATOR FOR USE WITH DAMPING FLUID METERING PINS

[75] Inventor: Jean P. Labrecque, Stratford, Conn.

[73] Assignee: The United States of America as represented by the Secretary of the Navy, Washington, D.C.

[21] Appl. No.: 840,189

[22] Filed: Oct. 6, 1977

[51] Int. Cl.² .................... F16F 9/06; G01F 23/00
[52] U.S. Cl. .................... 116/118 R; 73/290 R; 188/1 A; 188/322
[58] Field of Search ........... 116/114 Q, 118 R, 124 C, 116/124 J, 114 R, 109, 110; 188/1 A, 289, 314, 322; 267/64 R, 65 R; 73/307, 290 R

[56] References Cited

U.S. PATENT DOCUMENTS

| 2,385,545 | 9/1945 | Simpson | 73/290 R |
|---|---|---|---|
| 2,609,195 | 9/1952 | Drakeley | 267/64 R |
| 2,655,232 | 10/1953 | Etherton | 267/64 R |
| 2,698,751 | 1/1955 | Nye | 267/64 R |
| 2,735,674 | 2/1956 | Smith | 267/64 R |
| 2,737,301 | 3/1956 | Thornhill | 267/64 R |
| 2,814,482 | 11/1957 | Anderson | 267/64 R |
| 2,825,553 | 3/1958 | Smith | 267/64 R |
| 3,078,967 | 2/1963 | Brown | 188/289 |

*Primary Examiner*—S. Clement Swisher
*Assistant Examiner*—Denis E. Corr
*Attorney, Agent, or Firm*—R. S. Sciascia; L. I. Shrago; C. E. Vautrain, Jr.

[57] ABSTRACT

An oleo strut oil level indicator is provided which includes a rod slidably extending through a landing gear or other metering pin contacting the strut floating piston at one end and terminating at a frangible disc at the opposite end. Excessive oil loss in the strut produces a commensurate displacement of the floating piston toward the frangible disc, causing the opposite rod end to rupture the disc at a selected piston position and exposing a colored low oil level indicator to view thereby visually indicating a condition of potential danger.

7 Claims, 4 Drawing Figures

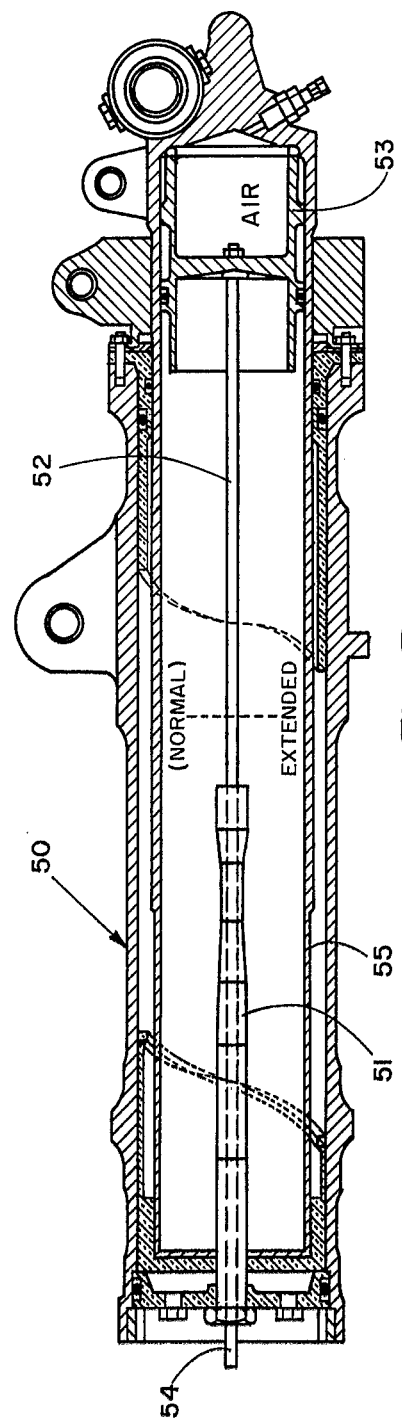
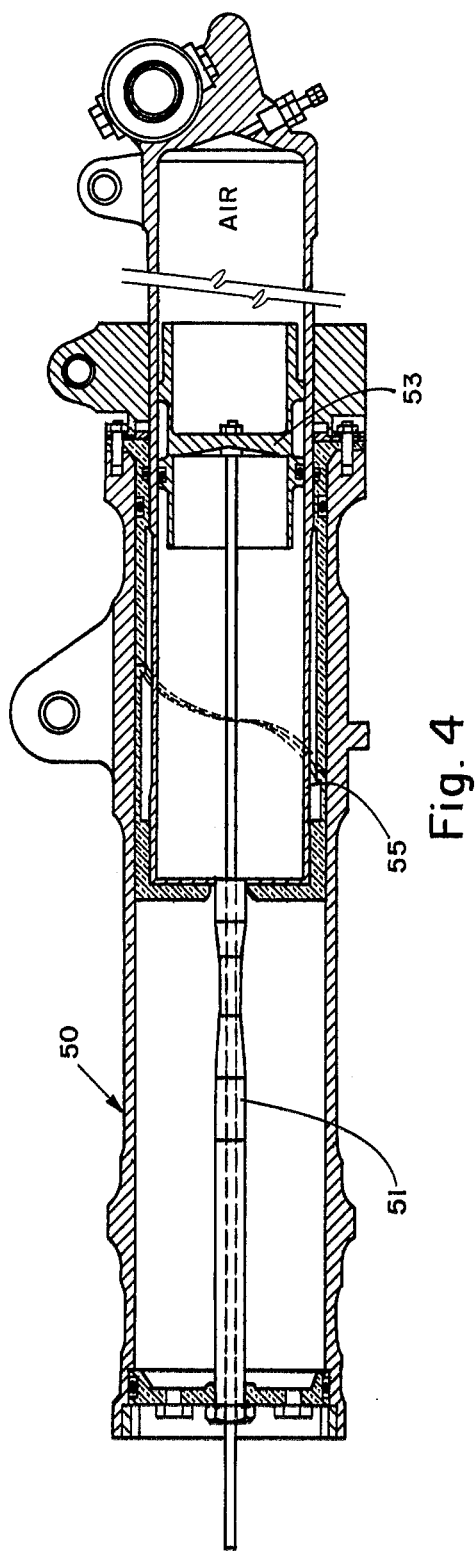

OIL LEVEL INDICATOR FOR USE WITH DAMPING FLUID METERING PINS

The present invention concerns low oil level indicators and, more particularly, means insertable in existing structures for positively indicating excessive loss of oil.

Presently, no known means exist for determining the amount of oil in aircraft oleo struts among other similar components, that is for indicating whether the oil level in any landing gear strut is low and requires additional oil, short of a very lengthy partial disassembly of each strut. The procedure generally followed is to rely on visual inspection of the struts and to routinely add air when the struts are low. This approach ignores the oil level and can result in dangerous overinflation when the oil supply is low. Moreover, when the oil is low the strut can bottom out at touchdown causing it to act like a solid strut and imposing huge unintended loads on critical parts which often result in serious damage or failure, and also preventing the strut from fully extending and hereby reducing the required stroke for energy absorption. The present invention avoids the foregoing dangers by providing visual means for alerting maintenance personnel to the amount of oil within each oleo strut.

Accordingly, it is an object of the present invention to provide means for visually determining the amount of oil in an oleo strut or other hydraulic fitting.

Another object of this invention is to provide means for sensing the exact amount of hydraulic fluid within an aircraft oleo strut wherein the sensing means is correlated to the attitude of the landing gear.

A further object of this invention is to provide in existing oleo strut hardware an arrangement which affords a quick and positive mechanical check of the location of the strut floating piston and, therefore, the amount of hydraulic fluid therein.

Other objects, advantages and novel features of the invention will become apparent from the following detailed description thereof when considered in conjunction with the accompanying drawings in which like numerals represent like parts throughout and wherein:

FIG. 3 is a sectional view of an aircraft oleo strut in the fully compressed condition with a modified form of the metering pin of FIG. 1 installed therein; and FIG. 4 is a sectional view of the srtut of FIG. 3 in the fully extended condition.

In an oleo strut, the air/oil assembly absorbs energy by forcing hydraulic fluid through a strut orifice by a positon moveable in the strut cylinder. The orifice opening is varied by a metering pin of changing diameter moving therethrough in response to strut loads so as to provide a selected resistance to oil flow from the cylinder into the piston. The varied opening provides a cushioning reaction while the aircraft is landing, taxiing and maneuvering on the ground. A chamber of compressed air communicates with the remote end of the floating piston to restore the strut to a static position.

The present invention, in general, provides novel landing gear strut oil level indicating means which include a rod slidably extending through and in spring-loaded relationship with the landing gear metering pin. In the preferred embodiment, the rod is centrally disposed within the floating piston at one end and terminates in a colored indicator which abuts a rupturable disc at the opposite end. When oil loss is excessive, the floating piston contacts the bottom end of the rod-spring assembly, causing the indicator to rupture the disc, and exposing the disc to view thereby indicating a condition of insufficient oil in the cylinder. Alternatively, the slidable rod may be fixedly attached to the floating piston to provide a direct indication of oil level at all times by extending the rod through the end of the strut.

Figure 1:
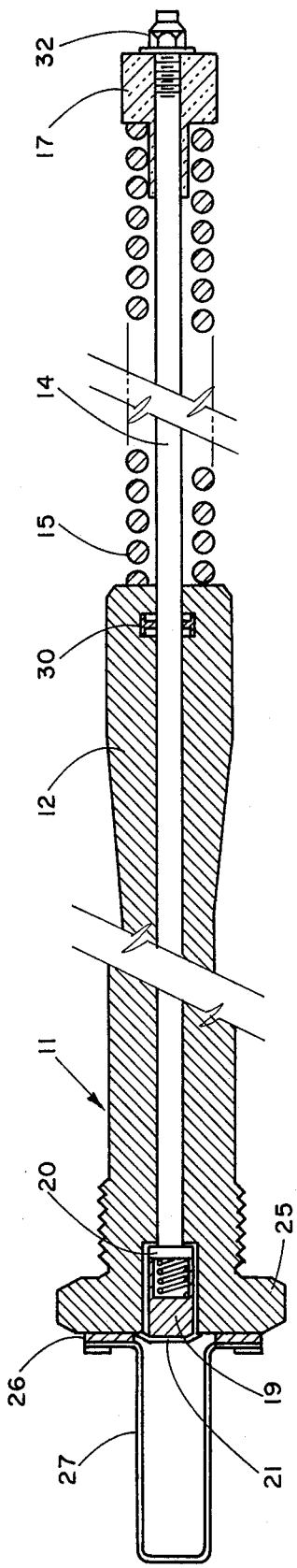
FIG. 1 is a sectional view of an oleo strut metering pin modified according to the present invention.
Figure 2:
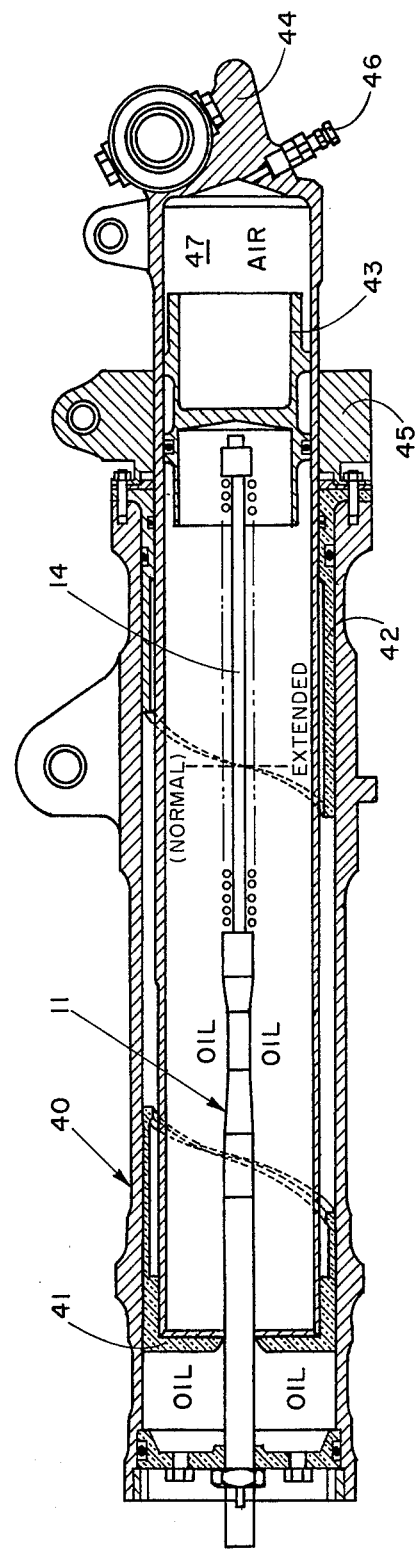
FIG. 2 is a sectional view of an aircraft oleo strut with the metering pin of FIG. 1 installed therein.

Referring to the drawings, FIG. 1 shows a preferred indicator assembly 11 of the oil level indicator of the present invention in sections due to its extreme length and containing a conventional metering pin 12 modified by a sensing rod 14 slidably installed therein and spring-loaded by a spring 15 preferably extending from a base stop member 17 to the adjacent surface of the metering pin 12. At its end opposite base 17, sensing rod 14 terminates in a color indicator 19 which is mounted in spring-loaded relationship between a flange 20 on rod 14 and a rupturable disc 21 that is secured to metering pin 12 at a flange 25 at this end by an elastomer seal 26 and a transparent cover assembly 27. Metering pin 12 is provided with an internal seal 30 to prevent the passage of hydraulic fluid into the interior of the pin. Base 17 is secured in position by a nut 32 by means of which a selected compression of spring 15 is obtained. In FIG. 2, assembly 11 is shown installed in an oleo strut cylinder 40 having as its major components an upper bearing and centering cam 41, a lower bearing and centering cam 42, a floating piston 43 disposed in a piston 44, a damper 45, and an air valve 46 in piston 44 for admitting air into an air chamber 47.

FIG. 3 shows an oleo strut 50 in which a metering pin 51 has installed therein an indicator rod 52 which in this instance is secured at its base end to a floating piston 53 and is free at its other end to expose or hide a color indicator 54 as the piston translates axially to its extended and compressed positions. Strut 50 is shown in the fully compressed condition wherein metering pin 51 is substantially contained within piston cylinder 55 of the strut and an ample supply of oil is present in the system. FIG. 4 shows strut 50 in the fully extended condition wherein metering pin 51 is disposed substantially outside of piston cylinder 55 and again an ample supply of oil is contained in the system.

In operation, referring to the embodiment of FIGS. 1 and 2, when the oil supply in the strut has been depleted sufficiently to allow upper bearing 41 of piston 44 to contact the corresponding surface of cylinder 40 any further movement of floating piston 43 in response to air pressure in chamber 47 will cause the piston to approach and thereafter contact the end of rod 14. Further movement of piston 43 toward upper bearing 41 will drive rod 14 through rupturable disc 21, exposing colored indicator 19 to view and alerting personnel to the condition of low oil supply well in advance of depletion of the supply to a damaging level. In the embodiment of FIGS. 3 and 4, a depletion of the supply of oil will cause piston 53 to rise in the cylinder and the positive connection of rod 52 to piston 53 will drive colored indicator 54 at the upper end of rod 52 further out of cylinder 50 so as to become more visible as more of the rod 52 is exposed. The visual indication of the position of floating piston 53 also enables personnel to correlate the piston 53 position with the landing gear position.

The indicator arrangement of the present invention thus provides a quick and position mechanical check of the location of the floating piston and consequently the amount of hydraulic fluid in the oleo strut.

Obviously, many modifications and variations of the invention are possible in the light of the foregoing teachings. For example, an electrical rotary transducer may be secured to the floating piston to correlate the piston and landing gear positions of a transducer may be placed externally of the top of the strut and activated by the indicator rod. In addition, a linear transducer using the metering pin core and a telescopic device secured to a floating piston electrical wire extending out of the top of the metering pin may be used to correlate floating piston and landing gear positions.

What is claimed is:

1. A hydraulic fluid level indicator for use in combination with a hydraulic fluid metering pin positioned in an extensible shock absorbing unit comprising:
    a rod slidably received in a bore extending longitudinally through a metering pin;
    means preventing the passage of oil through said bore; and
    means urging said rod out one end of said metering pin into view upon the occurrence of selected conditions in said unit,
        the exposed portion of said rod indicating extremely extended positions of said unit resulting from unusually low hydraulic fluid levels therein which levels normally would be concealed by increased air pressure in said unit.

2. The device as defined in claim 1 and further including means secured to said metering pin for enclosing the outwardly extensible end of said indicating rod,
    said enclosing means transparent and including a frangible disc secured to said metering pin and rupturable at a selected force applied by said rod; and
    a colored indicator secured to said rod adjacent said frangible disc for enhancing the visual indication of low hydraulic fluid levels.

3. The device as defined in claim 2 wherein said shock absorbing unit includes a floating piston remote from said metering pin; and
    means resiliently mounting said rod between said floating piston and said frangible disc.

4. The device as defined in claim 1 wherein said shock absorbing unit includes a floating piston remote from said metering pin and the interior end of said rod is secured to said piston.

5. A system for indicating the level of oil in shock absorbers having an air chamber in one end of a floating piston and an oil chamber in the opposite end thereof and wherein said floating piston is mounted in a piston movable in a closed oil-filled cylinder comprising:
    a metering pin secured to said cylinder and extending into the oil chamber of said piston through an orifice at the end thereof remote from said floating piston;
    an indicating rod slidably received in a bore extending longitudinally through said metering pin;
    means preventing the passage of oil through said bore; and
    means resiliently confining said rod between said floating piston and frangible retaining means on said metering pin until the occurrence of a selected movement of said floating piston,
        whereby excessive air pressure in the air chamber of said floating piston will cause said rod to extend through said retaining means thereby indicating low hydraulic fluid levels.

6. A system for indicating the level of oil in shock absorbers having a floating piston separating an air chamber and an oil chamber wherein the floating piston is mounted in a piston movable in a closed oil-filled cylinder comprising:
    a metering pin secured to said cylinder and extending into said oil chamber through an orifice in the adjacent end of said piston;
    indicating means slidably received in a bore extending longitudinally through said metering pin; and
    means preventing the passage of oil through said bore, said indicating means movable at one end by said floating piston and extending beyond said metering pin at the opposite end so that the level of oil in said piston is directly indicated by the distance said indicating means extends out of said metering pin.

7. The system as defined in claim 6 wherein said indicating means is secured to said floating piston at said one end.

* * * * *